United States Patent [19]
Ueda et al.

[11] Patent Number: 5,363,753
[45] Date of Patent: Nov. 15, 1994

[54] MACHINE FOR PRODUCING SOYBEAN CURD

[75] Inventors: Michio Ueda; Yoshihito Kondo; Hiroaki Umazume, all of Tokushima, Japan

[73] Assignee: Shikoku Kakoki Co., Ltd., Tokushima, Japan

[21] Appl. No.: 149,338

[22] Filed: Nov. 9, 1993

[30] Foreign Application Priority Data

Nov. 11, 1992 [JP] Japan .................. 4-77684[U]

[51] Int. Cl.$^5$ .................. A23C 3/02; A23J 1/00; A23L 1/20
[52] U.S. Cl. ..................... 99/453; 99/459; 99/465; 99/483; 99/496
[58] Field of Search .................. 99/353–356, 99/452, 453, 458–460, 465, 467, 473, 474, 477–479, 483, 495, 496, 509, 510; 100/115, 116, 118, 125; 249/113; 425/84, 405 R

[56] References Cited

U.S. PATENT DOCUMENTS

| | | | |
|---|---|---|---|
| 4,996,916 | 3/1991 | Miyawaki et al. | 99/453 |
| 5,058,494 | 10/1991 | Hayashi et al. | 99/453 |
| 5,249,513 | 10/1993 | Ueda | 99/453 |

*Primary Examiner*—Timothy F. Simone
*Attorney, Agent, or Firm*—Armstrong, Westerman, Hattori, McLeland & Naughton

[57] ABSTRACT

A machine for producing soybean curd comprises a conveyor having coagulating buckets, a device for filling a mixture of soybean milk and a coagulant into the buckets, means for heating the mixture in the buckets to coagulate the mixture into soybean curd, and a device for withdrawing the soybean curd from the buckets. A preheater for preheating the buckets to a temperature higher than the temperature of the mixture to be filled is disposed for a path of travel of the buckets at a position upstream from the filling device.

6 Claims, 1 Drawing Sheet

5,363,753

MACHINE FOR PRODUCING SOYBEAN CURD

BACKGROUND OF THE INVENTION

The present invention relates to a machine for producing soybean curd, and more particularly to a machine for producing a large quantity of fine-textured soybean curd ("kinugoshi tofu") as placed in containers.

Such machines for producing soybean curd are already known which comprise a conveyor having coagulating buckets, a device for filling a mixture of soybean milk and a coagulant into the buckets, a heater for heating the mixture to coagulate the mixture into soybean curd, and a device for withdrawing the soybean curd from the buckets.

With the machine described, it has been difficult to smoothly withdraw the soybean curd from the coagulating bucket because the soybean remains adhering to the bucket and is therefore likely to break or crack.

SUMMARY OF THE INVENTION

The main object of the present invention is to provide a soybean curd production machine wherein the soybean curd prepared can be withdrawn smoothly from coagulating buckets without breaking or cracking.

The present invention provides a machine for producing soybean curd which comprises a conveyor having coagulating buckets, a device for filling a mixture of soybean milk and a coagulant into the coagulating buckets, a heater for heating the mixture to coagulate the mixture into soybean curd and a device for withdrawing the soybean curd from the coagulating buckets, the machine being characterized in that a preheater for preheating the coagulating buckets to a temperature higher than the temperature of the mixture to be filled is disposed for a path of travel of the buckets at a position upstream from the filling device.

With the soybean curd production machine of the present invention, the preheater is disposed along the path of travel of the bucket upstream from the filling machine for preheating the coagulating bucket to a temperature higher than the temperature of the mixture to be filled thereinto, so that when the mixture of soybean milk and coagulate is filled into the preheated bucket, the portion of the mixture brought into contact with the bucket is rapidly coagulated to release water, which forms a film of water between the bucket and the soybean.

According to the present invention, therefore, the soybean can be prevented from adhering to the bucket and smoothly withdrawn from the bucket.

DESCRIPTION OF THE PREFERRED EMBODIMENT

Figure 1:
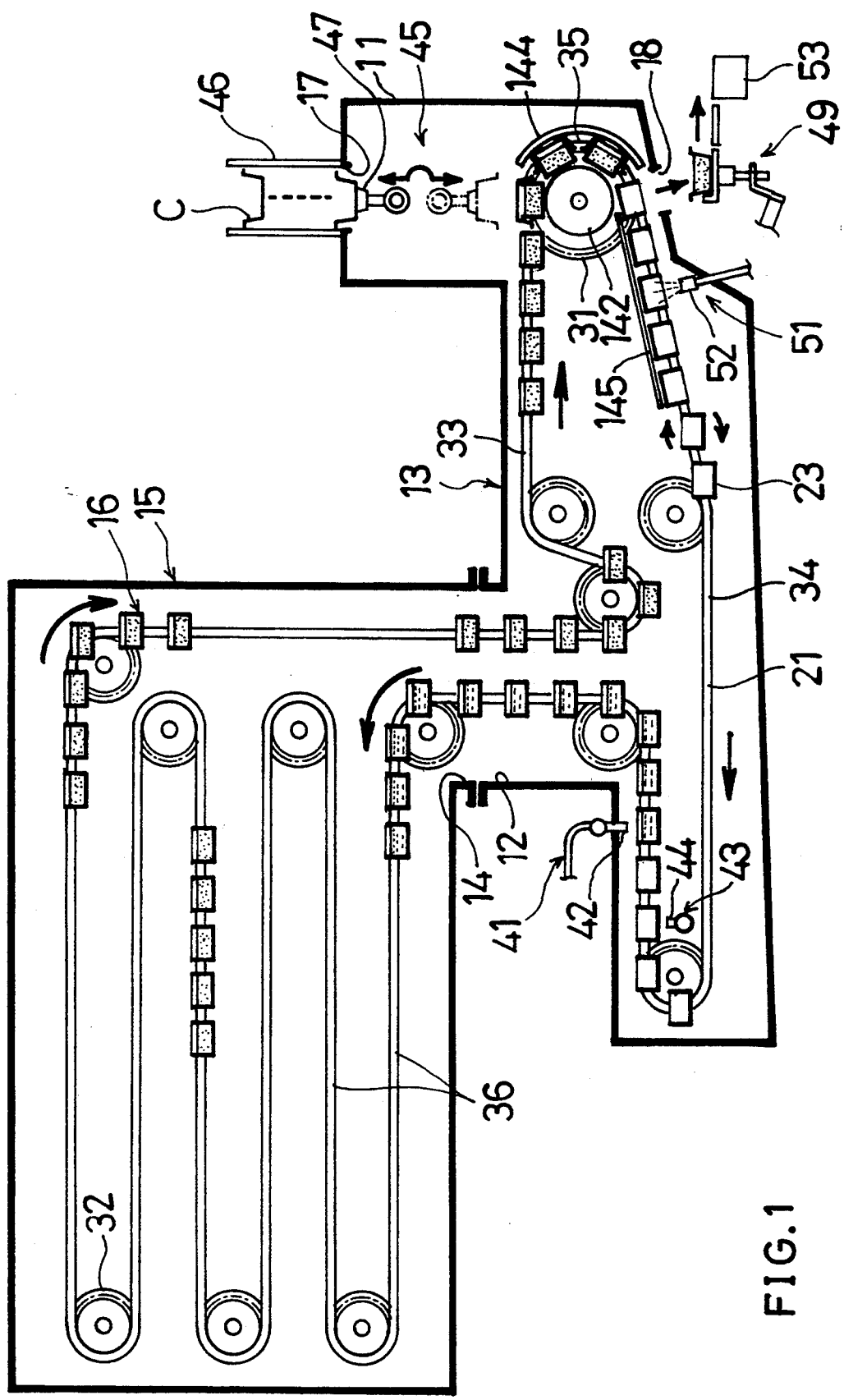
FIG. 1 is a view in longitudinal vertical section showing a soybean curd production machine of the invention in its entirety.

An embodiment of the invention will be described below with reference to the drawing. In the following description, the terms "front" and "rear" are used with reference to FIG. 1; the right-hand side of FIG. 1 will be referred to as "front," and the opposite side thereof as "rear." The terms "right" and "left" will be used for the apparatus as it is seen toward the front.

FIG. 1 shows an apparatus for producing fine-textured soybean curd or "kinugoshi tofu." The apparatus comprises a lower chamber 13 having an upward extension chamber 11 formed at the front end of its top wall and an upward communication opening 12 formed in a top wall portion near its rear end, an upper chamber 15 having a downward communication opening 14 formed in its bottom wall and communicating with the opening 12, and a bucket conveyor 16 provided in both the lower chamber 13 and the upper chamber 15 and extending through the two openings 12, 14.

The lower and upper chambers 13, 15 are each closed. Aseptic air is supplied to the lower chamber 13 to maintain the interior thereof at a positive pressure and at a temperature of about 25° to about 30° C. Steam is supplied to the upper chamber 15 to maintain the interior thereof at a high temperature of about 95° C. The extension chamber 11 has a top wall formed with a container inlet 17. The lower chamber 13 has a bottom wall formed with a container outlet 18 in a front end portion thereof.

The bucket conveyor 16 comprises a pair of right and left endless chains 21 movable in circulation within the lower and upper chambers 13, 15, a multiplicity of holders (not shown) connected between the chains 21 and arranged at a predetermined spacing, and a plurality of buckets 23 attached to each of the holders. Although not shown, the holder is pivoted to the chains with horizontal pins, thereby permitting the buckets 23 to be positioned always with their openings up when in a spontaneous state.

Each of the chains 21 is reeved around an intermittently driving sprocket 31 disposed in an interior front portion of the lower chamber 13 and a plurality of driven sprockets 32 arranged at required positions inside the two chambers 13, 15. The buckets 23 are movable along an upper path 33 extending generally forward within the lower chamber 13, a lower path 34 extending rearward below the upper path 33, an inverting path 35 interconnecting the front ends of the upper path 33 and the lower path 34, and a zigzag path 36 deflected upward from an intermediate portion of the upper path 33 to extend into the upper chamber 15, further extending upward while zigzagging forward and rearward within the upper chamber 15, and then directed downward to join the upper path 33.

A holder guide 142 in the form of a vertical disk is disposed concentrically with the driving sprocket 31. On the other hand, a circular-arc container guide 144 is disposed alongside the inverting path 35. A guide rail 145 extends from a position close to the lower end of the holder guide 142 to the position where a washing device 51 is located.

A top wall rear portion of the lower chamber 13 is provided with a filling device 41. The filling device 41 has filling nozzles 42 positioned near the rear end of the upper path 33 and extending through the top wall rear portion of the lower chamber 13.

A bucket preheater 43 is disposed slightly to the rear of the filling device 41. The preheater 43 has steam nozzles 44 opposed to the upper path 33 from therebelow immediately in the rear of the filling nozzles 42.

Disposed inside the extension chamber 11 is a covering device 45 positioned at the front end of the upper path 33. The covering device 45 comprises magazines 46 arranged along the edge of the container inlet 17 and each accommodating a multiplicity of containers C as oriented upward and stacked up, and vacuum cups 47 each arranged between the magazine 46 and the upper path 33 immediately therebelow, movable upward and downward and invertible through 180 deg.

A withdrawing device 49 is disposed at the front end of the lower path 34. The above-mentioned washing device 51 is disposed slightly to the rear of the device 49 and has wash liquor jet nozzles 52 oriented upward toward the lower path 34 from therebelow. The wash liquor is, for example, aseptic water having a temperature of 15° to 25° C. A container conveyor 53 extending transversely of the machine is disposed immediately in front of the withdrawing device 49.

The bucket 23 is made of plastics and molded in the form of a square or rectangular box when seen from above. The bucket 23 has a capacity to contain an amount of soybean curd corresponding to a piece of soybean curd of specified size (about 400 c.c. on the average) with an allowance. The bucket 23 is made of plastics so as to be inexpensive to make. If heat conductivity and durability are more important than the cost, the bucket may be made of stainless steel.

Soybean curd is produced by the procedure to be described below.

When buckets 23 are brought to the position of the filling device 41, each nozzle 42 fills into the bucket 23 a mixture of soybean milk and coagulant in an amount corresponding to one piece of soybean curd mentioned above. The coagulant is magnesium chloride (bittern). The mixture is prepared from soybean milk and the coagulant which are cooled to a temperature lower than the coagulating temperature, for example, to 18° to 30° C., preferably 25±1° C., by mixing these ingredients together immediately before filling.

Before the buckets 23 are fed to the filling filling device 41, they are brought to the location of the preheater 43, whereupon the steam nozzles 44 force out steam against the respective buckets 23. The buckets 23 are preheated with the steam to a temperature which is 15° to 25° C., preferably about 20°±2° C., higher than the tempertures of the mixture to be filled into the buckets 23. When the bucket 23 is thus preheated, the portion of the mixture subsequently brought into contact with the bucket 23 is rapidly coagulated, and the coagulated portion releases water, which forms a film of water between the bucket 23 and soybean. Consequently, when to be withdrawn from the bucket 23, the soybean readily separates from the bucket 23. If the preheating temperture is lower than the above range, a reduced amount of water will be released which fails to produce the contemplated effect fully, whereas if the temperature is higher than the range, an excess of water will be released to render the product commercially valueless.

The buckets 23 filled with the mixture move upward out of the lower chamber 13 into the upper chamber 15, travel zigzag within the upper chamber 15 and finally move downward to enter the lower chamber 13 again. In the meantime, the buckets 23 remain oriented upward. The time taken for the buckets 23 to pass through the upper chamber 15 is about 40 minutes, and during this period, the mixture within the buckets 23 coagulated into soybean curd.

When the bucket 23 is subsequently brought to below the covering device 45, the vacuum cup 47 attracts thereto from the magazine 46 a container C with its opening up, turn upside down while lowering and places the container C as inverted over the bucket 23.

The bucket 23 so far remains oriented upward. While the bucket 23 thereafter moves along the inverting path 35, the holder 22 is restrained from pivotally moving by itself by the holder guides 142, and the container guide 144 prevents the container C from turning by itself and falling off. In the meantime, the bucket 23 as covered with the container C is inverted and oriented downward, while the container C is positioned with its opening up, allowing the soybean curd to move inside the bucket 23 and to be supported by the bottom of the container C.

The container C accommodating the soybean curd reaches a position above the container outlet 18 along with the bucket 23, whereupon the withdrawing device 49 moves the container C away from the bucket 23, transferring the soybean curd to the container C, and delivers the curd-containing container C from the lower chamber 13 onto the container discharge conveyor 53 through the container outlet 18.

The bucket 23 separated from the container C is thereafter washed with the wash liquor forced out from the nozzle 52, whereby the bucket 23 is cooled to a temperature approximately equal to the internal temperature of the lower chamber 13. The holder is thereafter released from the holder guides 145, whereupon the washed bucket 23 turns by itself to an upwardly oriented position again.

What is claimed is:

1. A machine for producing soybean curd comprising:
    a coveyor having coagulating buckets,
    a device for filling a mixture of soybean milk and a coagulant into the coagulating buckets,
    means for heating the mixture in the buckets to coagulate the mixture into soybean curd, and
    a device for withdrawing the soybean curd from the coagulating buckets,
    the machine being characterized in that a preheater for preheating the coagulating buckets to a temperature higher than the temperature of the mixture to be filled is disposed for a path of travel of the buckets at a position upstream from the filling device.

2. A machine as defined in claim 1 wherein the preheater has a steam nozzle.

3. A machine as defined in claim 1 wherein the path of travel of the buckets is endless, and the withdrawing device and the filling device are arranged along the path, a washing water nozzle being disposed between the devices.

4. A machine as defined in any one of claims 1 to 3 wherein the temperature of the mixture to be filled is lower than the coagulating temperature of the mixture, and the temperature difference between the mixture to be filled and the preheated coagulating buckets is 15° to 25° C.

5. A machine as defined in any one of claims 1 to 3 wherein the temperature of the mixture to be filled is 18° to 30° C., and the temperature difference between the mixture to be filled and the preheated coagulating buckets is 15° to 25° C.

6. A machine as defined in any one of claims 1 to 3 wherein the temperature of the mixture to be filled is 25°±1° C., and the temperature difference between the mixture to be filled and the preheated coagulating buckets is 20°±2° C.

* * * * *